United States Patent
Neumann et al.

(10) Patent No.: US 10,711,739 B2
(45) Date of Patent: Jul. 14, 2020

(54) EXHAUST-GAS SWITCH FOR A VEHICLE

(71) Applicant: BorgWarner Ludwigsburg GmbH, Ludwigsburg (DE)

(72) Inventors: Till Neumann, Baltmannsweiler (DE); Markus Baumann, Ludwigsburg (DE); Markus Wagner, Ludwigsburg (DE); Bernd Bareis, Täferrot-Utzstetten (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 0 days.

(21) Appl. No.: 16/200,243

(22) Filed: Nov. 26, 2018

(65) Prior Publication Data

US 2019/0170091 A1     Jun. 6, 2019

(30) Foreign Application Priority Data

Dec. 1, 2017 (DE) .................. 10 2017 128 541

(51) Int. Cl.
| | |
|---|---|
| *F01N 1/00* | (2006.01) |
| *F02M 26/70* | (2016.01) |
| *F16K 11/052* | (2006.01) |
| *F16K 27/02* | (2006.01) |
| *F02M 26/71* | (2016.01) |

(52) U.S. Cl.
CPC ............ *F02M 26/70* (2016.02); *F02M 26/71* (2016.02); *F16K 11/052* (2013.01); *F16K 11/0525* (2013.01); *F16K 27/0209* (2013.01)

(58) Field of Classification Search
CPC ............................ F02M 26/70; F16K 11/0525
USPC .......................................................... 60/324
See application file for complete search history.

(56) References Cited

U.S. PATENT DOCUMENTS

| | | | |
|---|---|---|---|
| 3,664,706 A * | 5/1972 | Chant .................... | B60K 13/06 298/1 H |
| 5,464,370 A * | 11/1995 | Shimizu ................ | F16K 11/052 454/345 |
| 5,967,185 A * | 10/1999 | Baruschke ......... | B60H 1/00485 137/625.29 |
| 6,182,699 B1 * | 2/2001 | Hawkes ................ | F16K 11/052 137/861 |
| 6,698,717 B1 * | 3/2004 | Brookshire ........... | F02D 9/1045 251/305 |
| 2001/0047834 A1 * | 12/2001 | Menin ................. | F16K 11/0525 137/875 |

(Continued)

FOREIGN PATENT DOCUMENTS

| | | |
|---|---|---|
| DE | 10 2014 102 358 A1 | 8/2015 |
| DE | 102017218353 A1 * | 4/2019 ........... F16K 31/047 |

*Primary Examiner* — Jason D Shanske
(74) *Attorney, Agent, or Firm* — Bose McKinney & Evans LLP

(57) ABSTRACT

Described is an exhaust-gas switch, in particular for trucks, having a housing that has an inlet, a first outlet and a second outlet, having a shaft led out from the housing, and having a valve flap arranged in the housing that is pivotable about a geometric pivot axis by means of the shaft between a first position and a second position, the valve flap having a blocking portion that in the first position blocks the first outlet and in the second position blocks the second outlet. According to this disclosure, provision is made such that the valve flap bears a counterweight to the blocking portion, the geometric pivot axis being arranged between the blocking portion and the counterweight.

10 Claims, 5 Drawing Sheets

(56) References Cited

U.S. PATENT DOCUMENTS

| | | | | |
|---|---|---|---|---|
| 2003/0192606 A1* | 10/2003 | Heckt | ............... | F01N 3/031 |
| | | | | 137/875 |
| 2008/0302991 A1* | 12/2008 | Tseng | ............... | B64G 1/401 |
| | | | | 251/283 |
| 2013/0247604 A1* | 9/2013 | Giles | ............... | F16K 11/0525 |
| | | | | 62/238.7 |
| 2015/0240957 A1 | 8/2015 | Elsaesser et al. | | |
| 2016/0319946 A1* | 11/2016 | Suhnel | ............... | F16K 11/0525 |

\* cited by examiner

EXHAUST-GAS SWITCH FOR A VEHICLE

RELATED APPLICATIONS

This application claims priority to DE 10 2017 128 541.5, filed Dec. 1, 2017, the entire disclosure of which is hereby incorporated herein by reference.

BACKGROUND

This disclosure relates to an exhaust-gas switch for the exhaust system of a vehicle. Exhaust-gas switches are generally known from U.S. Publication No. 2015/0240957 A1.

Exhaust-gas switches are used in vehicle exhaust systems and are sometimes also called bypass valves. They are used specifically for controlling and separating gas flows in the exhaust system. For example, an exhaust-gas flow can be conveyed on an as-needed basis to a thermal energy recovery system or to an exhaust pipe with such an exhaust-gas switch.

Exhaust-gas switches for the exhaust systems of commercial vehicles are inherently large and therefore particularly susceptible to incited vibrations. Owing to the size and weight of the valves, vibrations can place considerable loads on various components, particularly shafts and actuators, which can not only negatively impact the control performance of the exhaust-gas switch but also considerably shorten the service life of the exhaust-gas switch or of an actuator associated therewith.

SUMMARY

This disclosure specifies a way in which the vibration load on exhaust-gas switches in vehicle exhaust systems can be reduced.

As in standard exhaust-gas switches, in an exhaust-gas switch according to this disclosure a valve flap is pivotally movable by means of an eccentrically-arranged shaft between a first position, in which a first outlet of the housing is blocked, and a second position, in which a second outlet of the housing is blocked. The shaft is thus arranged next to a flow channel defined by the housing, which leads from the inlet of the housing to the respective first and second outlets of the housing. The part of the valve flap that blocks the channel formed by the housing to the respective first and second outlets in these two positions shall henceforth be designated as the "blocking portion." The blocking portion has a blocking surface that corresponds to the cross-sectional area of the flow channel defined by the housing.

In an exhaust-gas switch according to this disclosure, the pivot axis defined by the shaft runs between the blocking portion and a counterweight. The counterweight reduces the mechanical load, in particular the torque load, on the shaft.

The valve flap can be completely counterbalanced by the counterweight, i.e., have an equal moment of inertia on both sides of the geometric pivot axis. Actually, a complete counterbalancing is not required for reducing the loads resulting from vibration during driving to a negligible level. During a pivoting of the valve flap about the geometric pivot axis, the counterweight preferably effects a moment of inertia equal to at least 15% of the moment of inertia effected by the blocking portion of the valve flap. For practical purposes, the goal is for the part of the valve flap that is situated on the side of the geometric pivot axis on which the counterweight is arranged to have a moment of inertia that is at least 15% of the moment of inertia of the part of the valve flap on the opposite side of the geometric pivot axis.

During a pivoting of the valve flap, the counterweight preferably effects a moment of inertia that is at least 25% of the moment of inertia of the moment of inertia effected by the blocking portion of the valve flap.

For example, the counterweight can be configured as a pin that is arranged parallel to the geometric pivot axis.

In an advantageous refinement of this disclosure the valve flap has two superimposed sheet metal discs, between which a portion of the shaft is secured. Sheet metal discs can be economically produced in any desired shape. Advantageously, not only can the sheet metal discs form the blocking portion of the valve flap, but they can also extend on the opposite side of the geometric pivot axis so that the counterweight can also be secured to the sheet metal discs, for example by arranging it between the sheet metal discs.

In another advantageous refinement of this disclosure the sheet metal discs are stiffened in the blocking portion by embossed corrugations. In this manner a mechanically stable valve flap can be created by thin sheet metal discs. A low valve flap weight means an advantageously low load on the shaft and on the actuator.

In another advantageous refinement of this disclosure the sheet metal discs have cut-outs for weight reduction. A cut-out in one of the two sheet metal discs is covered by the respective other sheet metal disc so that the valve flap has a closed, gas-tight surface. For example, such a cut-out can be arranged in a corrugation configured as a recess.

In another advantageous refinement of this disclosure the valve flap tapers in a wedge-shaped manner on the side of the geometric pivot axis facing away from the counterweight. In other words, it is preferable for the thickness of the blocking portion to decrease as the distance from the geometric pivot axis increases. Advantageously, in this manner the eigenfrequencies of the valve flap can be shifted to higher values, thus making it harder to induce flexural vibrations. In this case it is particularly advantageous if the depth of the corrugations embossed in the blocking portion decreases as the distance from the geometric pivot axis increases.

The superimposed sheet metal discs are preferably of identical shape. In this way it is possible to save on parts costs and simplify production.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
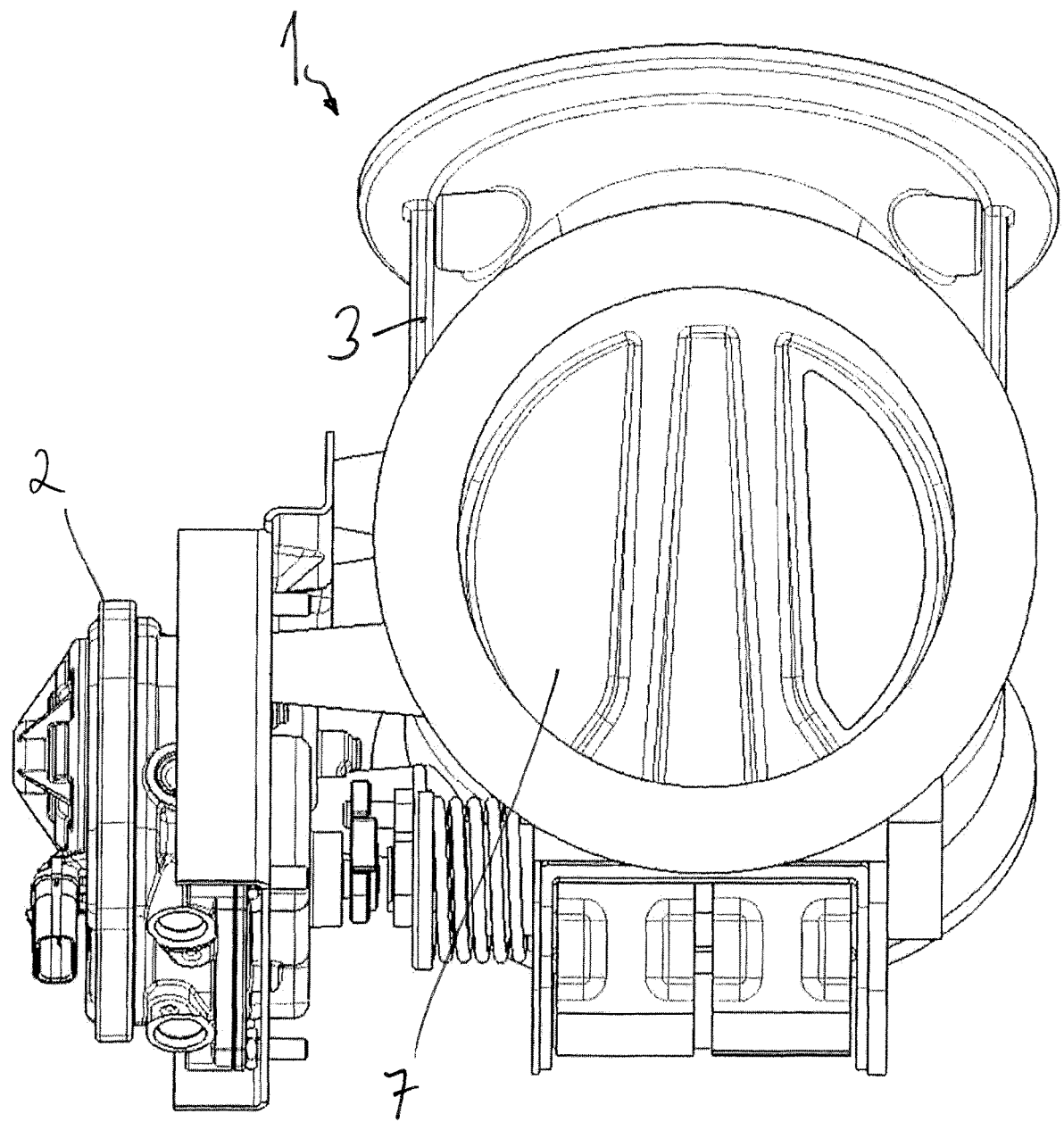
FIG. 1 is an exemplary embodiment of an exhaust-gas switch according to this disclosure with an actuator.
Figure 2:
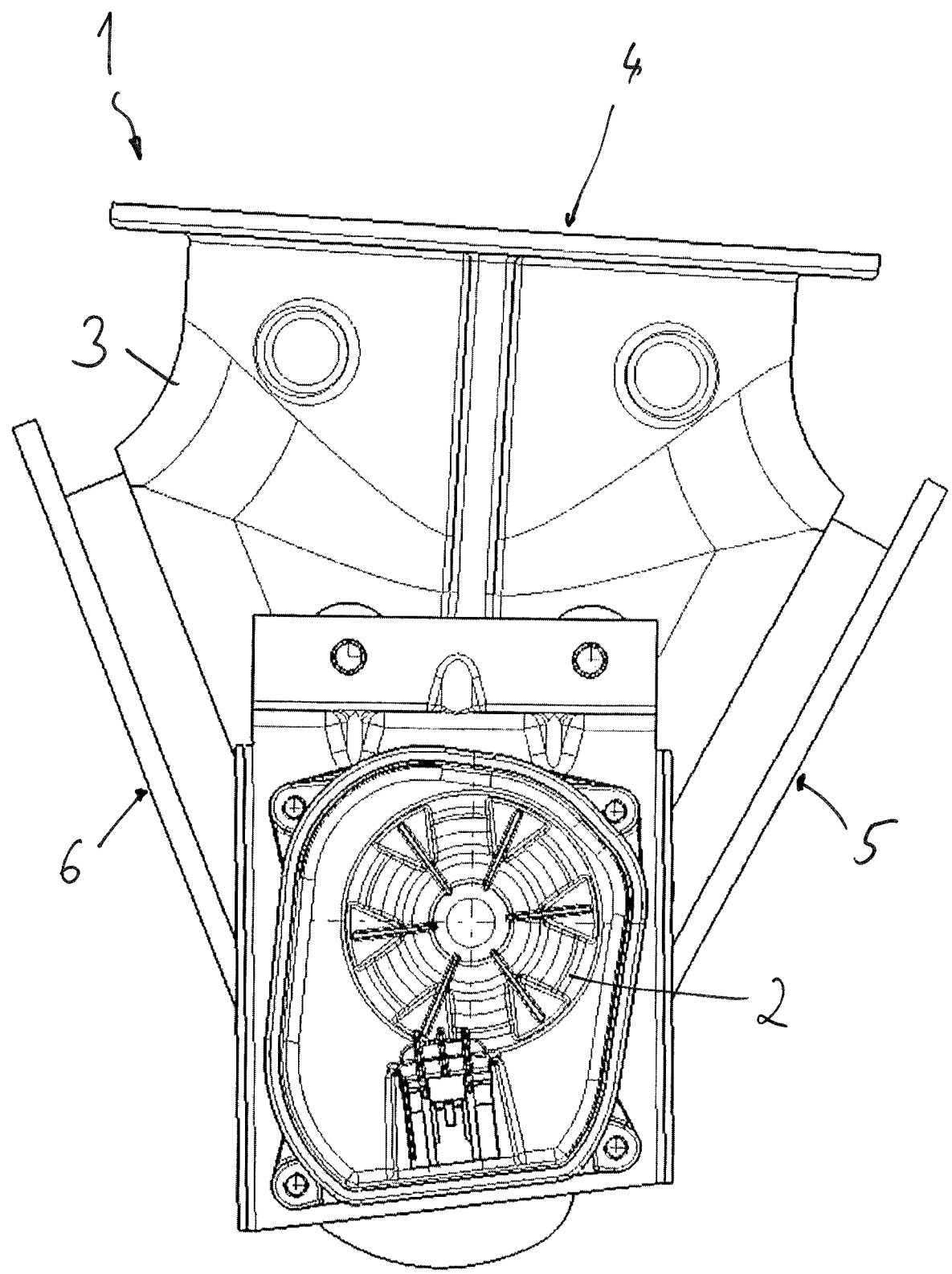
FIG. 2 is another view of FIG. 1.
Figure 3:
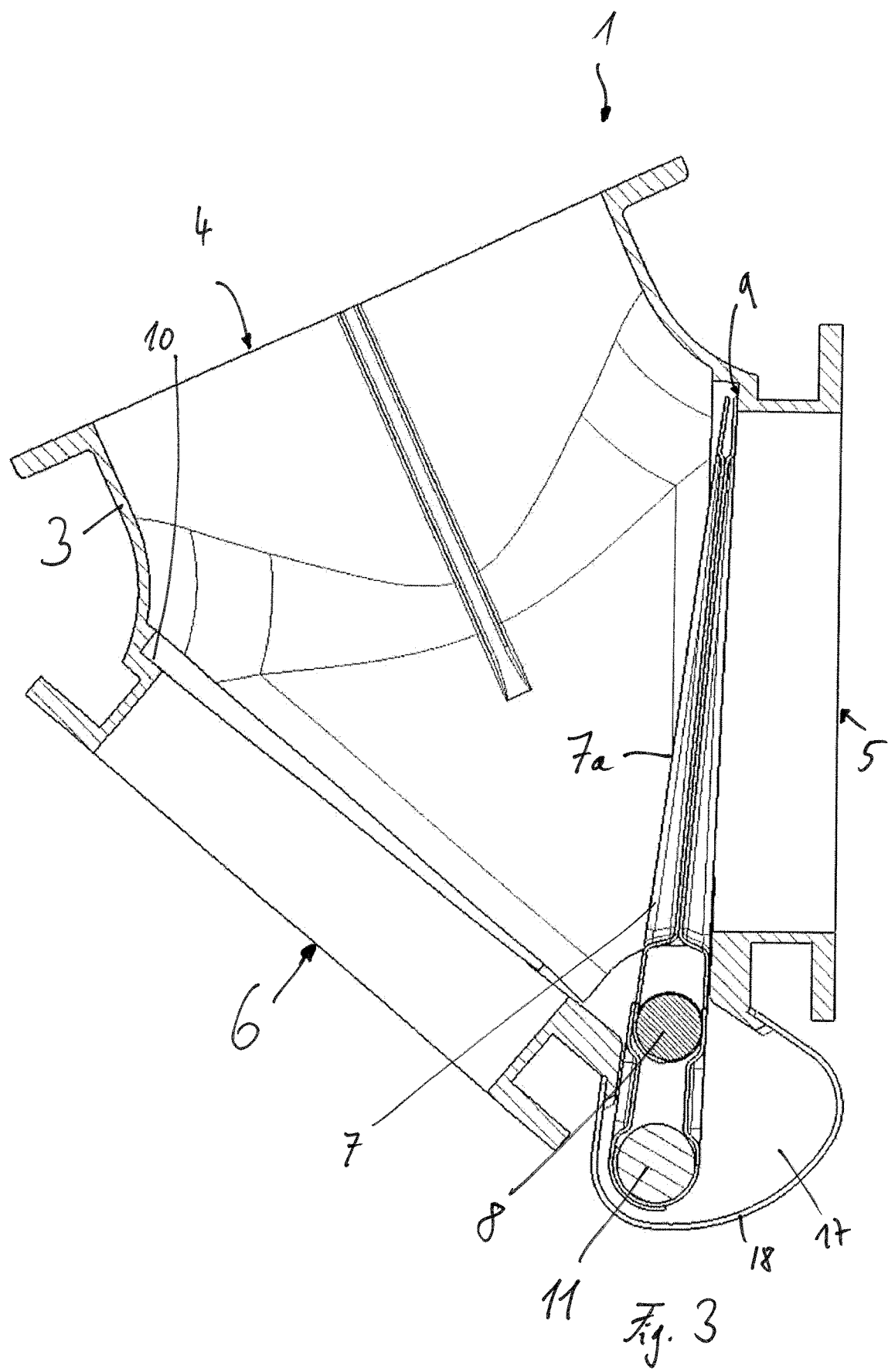
FIG. 3 is a sectional view of the exhaust-gas switch shown in FIGS. 1 and 2.

An exhaust-gas switch 1 for the exhaust system of a commercial vehicle is depicted together with an actuator 2 for actuating the same in FIGS. 1 and 2. The exhaust-gas switch 1 is depicted in a sectional view in FIG. 3.

The exhaust-gas switch 1 has a housing 3 with an inlet 4, a first outlet 5 and a second outlet 6. Arranged in the housing 3 is a valve flap 7, which can be pivoted between a first position and a second position by means of a shaft 8 led out from the housing 3 and attached to the actuator 2. The shaft 8 is arranged eccentrically to the valve flap 7 next to a flow channel, which leads from the inlet 4 to the respective first and second outlets in the housing 3.

In its first position, the valve flap 7 rests on a first valve seat 9 formed by the housing 3 and closes the first outlet 5 with a blocking portion 7a. In its second position, the valve flap 7 rests on a second valve seat 10 formed by the housing and then closes the second outlet 6 with the blocking portion 7a. The blocking portion 7a is thus the part of the valve flap 7 that, in the respective first and second positions of the valve flap 7, blocks the respective first and second outlets. The surface of the blocking portion 7a thus essentially corresponds to the free cross-sectional area of the flow channel, which the housing 3 defines on the respective first and second valve seats. In the exemplary embodiment shown, the blocking portion 7a of the valve flap 7 is a circular portion including the edge of the valve flap resting on the valve seat 9, 10 in the respective first and second positions of the valve flap 7.

Another portion, in which the shaft 8 and a counterweight 11 to the blocking portion 7a are arranged, adjoins the blocking portion 7a of the valve flap 7. The pivot axis of the valve flap 7 defined by the shaft 8 thus runs between the counterweight 11 and the blocking portion 7a of the valve flap 7.

The counterweight 11 relieves the mechanical load on the shaft 8 and on the actuator 2. In particular, the loads associated with vibrations during driving are considerably reduced by the counterweight 11. For example, the counterweight 11 can be a pin that is arranged parallel to the geometric pivot axis. The term "parallel" is understood in the context of typical manufacturing tolerances, which by definition must allow a slight deviation from a perfect geometric parallel.

During a pivot movement effected by the shaft 8, the counterweight 11 has, for example, a moment of inertia that is at least 15% of the moment of inertia of the blocking portion 7a, preferably at least 25% of the moment of inertia of the blocking portion 7a. The moment of inertia of the counterweight 11 should therefore be no more than 100%, preferably no more than 60%, of the moment of inertia of the blocking portion 7a.

The counterweight 11 is arranged in the housing 3 in a side room 17, which lies adjacent to the flow channel that leads from the inlet 4 to the respective first and second outlets in the housing 3. The side room 17 is defined by an opening in a housing body, which is closed by a lid 18. For example, the housing body can be a cast part, whereas the lid 18 is preferably made of sheet metal.

The valve flap 7 comprises two superimposed sheet metal discs 12, 13, between which a portion of the shaft 8 is secured. The counterweight 11 can also be arranged between the two sheet metal discs 12, 13. The sheet metal discs 12, 13 are rigidified by corrugations 14, 15, 16 in the blocking portion 7a, which is preferably circular.

For weight reduction, the two sheet metal discs 12, 13 have cut-outs 19, for example in a corrugation 16 configured as a recess. The cut-outs 19 in one of the two sheet metal discs 12, 13 are each covered by the respective other sheet metal disc 12, 13. By integrally connecting the two sheet metal discs 12, 13, for example by soldering or welding, a closed, gas-tight blocking portion 7a of the valve flap 7 is created in spite of the cut-outs 19. The cut-outs 19 enable an advantageous weight reduction of the valve flap 7, by which mechanical loads on the shaft can be reduced even further.

Figure 4:
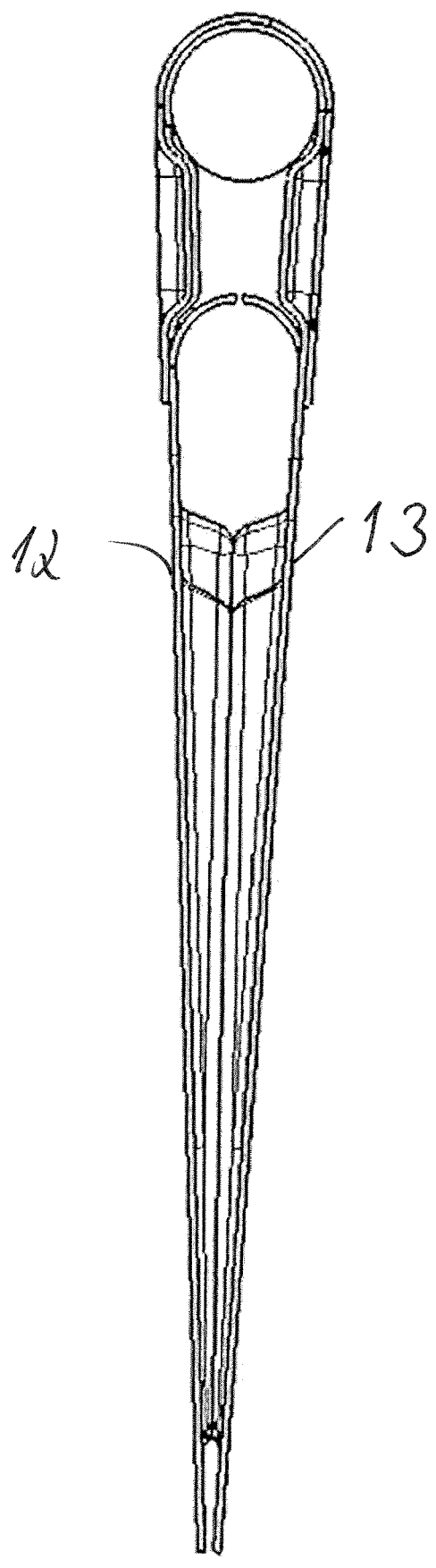
FIG. 4 is the valve flap of the exhaust-gas switch depicted in FIGS. 1 through 4.
Figure 5:
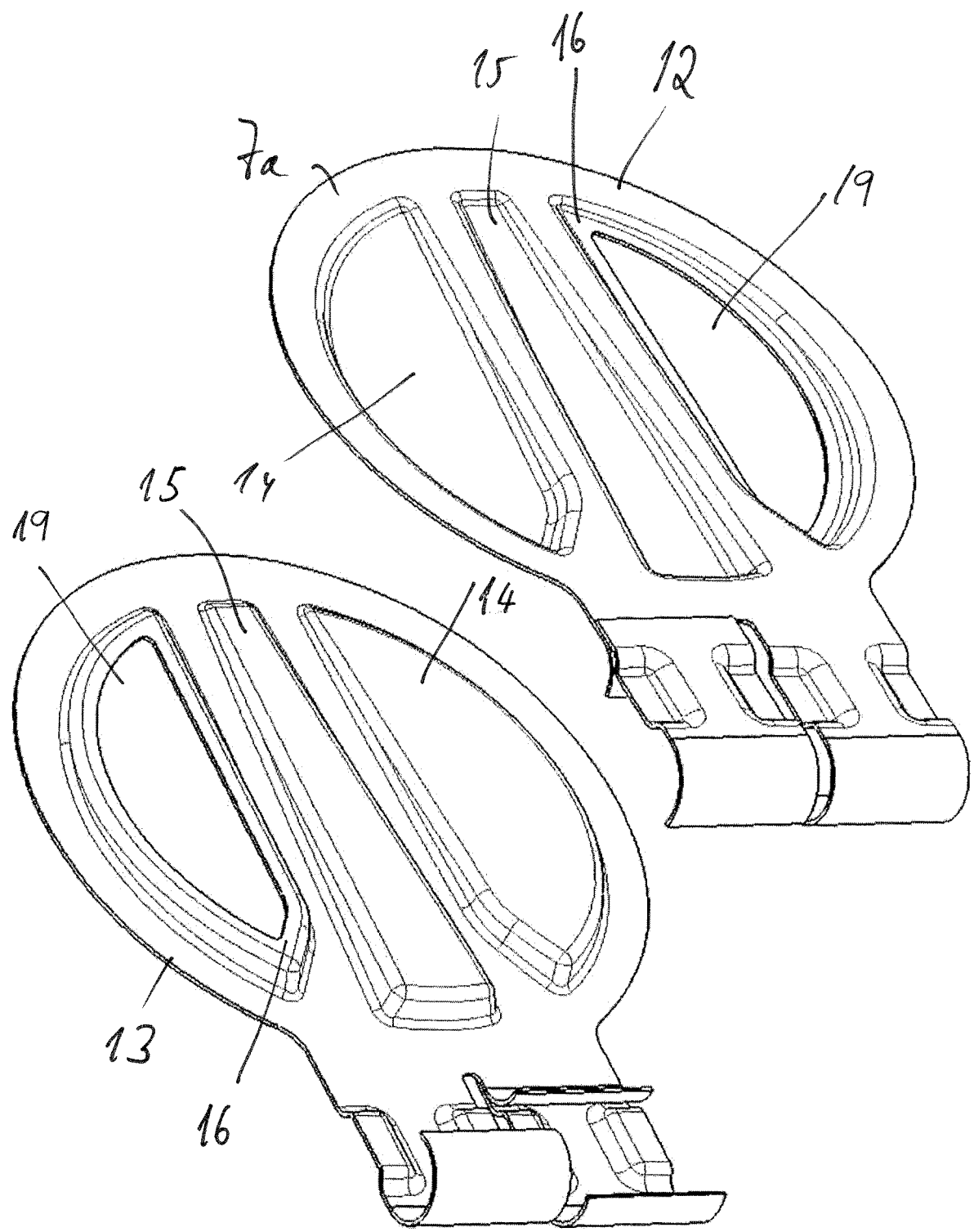
FIG. 5 illustrates parts of the valve flap depicted in FIG. 4.

As FIG. 4 in particular shows, the valve flap 7 tapers in a wedge-shaped manner on the side of the geometric pivot axis facing away from the counterweight 11. In other words, the valve flap 7 tapers in a wedge-shaped manner in the blocking portion 7a. The corrugations 14, 15, 16 therefore have a depth that decreases as the distance from the geometric pivot axis increases. This unique shape of the valve 7 likewise contributes to reducing the susceptibility of the system formed from the valve flap 7 and the shaft 8 to vibration.

The sheet metal discs 12, 13 are of identical construction and integrally interconnected, for example welded to one another. The sheet metal discs 12, 13 can also be welded to the shaft 8 and to the counterweight 11.

By designing the valve flap 7 as described, the eigenfrequency of the system formed from the valve flap 7 and the shaft 8 can be increased to values of over 100 Hz so that the vibration excitation while driving and the associated mechanical load on the shaft 8 are considerably reduced.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SIGNS

1 Exhaust-gas switch
2 Actuator
3 Housing
4 Inlet
5 First outlet
6 Second outlet
7 Valve flap
7a Blocking portion
8 Shaft
9 Valve seat
10 Valve seat
11 Counterweight
12 Sheet metal discs
13 Sheet metal discs
14 Corrugations
15 Corrugations
16 Corrugations
17 Side room
18 Lid
19 Cut-out

What is claimed is:
1. An exhaust-gas switch, comprising:
a housing having an inlet, a first outlet and a second outlet;
a shaft extending from the housing; and a valve flap arranged in the housing and being pivotable about a geometric pivot axis between a first position and a second position via the shaft;

wherein the valve flap defines a blocking portion that in the first position blocks the first outlet and in the second position blocks the second outlet;

wherein the valve flap bears a counterweight to the blocking portion, the geometric pivot axis being arranged between the blocking portion and the counterweight; and wherein the valve flap comprises two superimposed sheet metal discs, between which a portion of the shaft is held and wherein the counterweight is arranged between the two sheet metal discs.

2. The exhaust-gas switch according to claim 1, wherein the sheet metal discs include corrugations and at least one of the corrugations is configured as a recess in which a cut-out is arranged.

3. The exhaust-gas switch according to claim 1, wherein the sheet metal discs are of identical construction.

4. The exhaust-gas switch according to claim 1, wherein the counterweight is a pin arranged parallel to the geometric pivot axis.

5. The exhaust-gas switch according to claim 1, wherein the valve flap tapers in a wedge-shape on the side of the geometric pivot axis facing away from the counterweight.

6. The exhaust-gas switch according to claim 1, wherein during the pivot movement effected by the valve flap, the counterweight has a moment of inertia that is at least 15% of the moment of inertia of the blocking portion.

7. An exhaust-gas switch, comprising:
a housing having an inlet, a first outlet and a second outlet;
a shaft extending from the housing; and
a valve flap arranged in the housing and being pivotable about a geometric pivot axis between a first position and a second position via the shaft;
wherein the valve flap defines a blocking portion that in the first position blocks the first outlet and in the second position blocks the second outlet;
wherein the valve flap bears a counterweight to the blocking portion, the geometric pivot axis being arranged between the blocking portion and the counterweight; and
wherein the valve flap comprises two superimposed sheet metal discs, between which a portion of the shaft is held and wherein the two sheet metal discs have cut-outs, each of the cut-outs of one of the two sheet metal discs being covered by the respective other sheet metal disc.

8. An exhaust-gas switch, comprising:
a housing having an inlet, a first outlet and a second outlet;
a shaft extending from the housing; and
a valve flap arranged in the housing and being pivotable about a geometric pivot axis between a first position and a second position via the shaft;
wherein the valve flap defines a blocking portion that in the first position blocks the first outlet and in the second position blocks the second outlet;
wherein the valve flap bears a counterweight to the blocking portion, the geometric pivot axis being arranged between the blocking portion and the counterweight; and
wherein the valve flap comprises two superimposed sheet metal discs, between which a portion of the shaft is held and wherein the sheet metal discs are stiffened in the blocking portion by corrugations.

9. The exhaust-gas switch according to claim 8, wherein the depth of the corrugations decreases as the distance from the geometric pivot axis increases.

10. An exhaust-gas switch, comprising:
a housing having an inlet, a first outlet and a second outlet;
a shaft extending from the housing; and
a valve flap arranged in the housing and being pivotable about a geometric pivot axis between a first position and a second position via the shaft;
wherein the valve flap defines a blocking portion that in the first position blocks the first outlet and in the second position blocks the second outlet;
wherein the housing defines a first flow channel extending from the inlet to the first outlet when the blocking portion is in the second position and the housing defines a second flow channel extending from the inlet to the second outlet when the blocking portion is in the first position;
wherein the valve flap bears a counterweight to the blocking portion, the geometric pivot axis being arranged between the blocking portion and the counterweight; and
wherein the counterweight is arranged in a side room of the housing, which side room is arranged outside of and next to the first and second flow channels.

* * * * *